United States Patent [19]

Fujii et al.

[11] 4,323,919
[45] Apr. 6, 1982

[54] OPTICAL SCANNER FOR READING DATA RECORDED IN PLURAL COLORS

[75] Inventors: Motoharu Fujii, Tokyo; Noboru Koumura, Narashino; Naoki Ayata, Yokohama; Seiji Saito, Yokosuka; Yasushi Sato, Kawasaki, all of Japan

[73] Assignee: Canon Kabushiki Kaisha, Tokyo, Japan

[21] Appl. No.: 173,890

[22] Filed: Jul. 31, 1980

[30] Foreign Application Priority Data

Aug. 9, 1979 [JP] Japan .................. 54-101675
Aug. 9, 1979 [JP] Japan .................. 54-101676

[51] Int. Cl.³ .................................. H04N 1/46
[52] U.S. Cl. ........................................ 358/75
[58] Field of Search .............. 358/75; 340/146.3 B

[56] References Cited

U.S. PATENT DOCUMENTS 4,264,921 4/1981 Pennington et al. ............... 358/50

FOREIGN PATENT DOCUMENTS

54-12229 1/1979 Japan ............................ 340/146.3 B

Primary Examiner—Robert L. Richardson
Attorney, Agent, or Firm—Fitzpatrick, Cella, Harper & Scinto

[57] ABSTRACT

A reader is disclosed which optically and relatively scans surface bearing color informations to be read and reads said color informations while discriminating one from another by a plural number of photoreceptor elements.

7 Claims, 8 Drawing Figures

OPTICAL SCANNER FOR READING DATA RECORDED IN PLURAL COLORS

BACKGROUND OF THE INVENTION

1. Field of the Invention

The present invention relates to a reader adoptable in a copying machine for copying or duplicating an original document or the like or in other image forming apparatus such as facsimile. More particularly, the present invention relates a reader of the type in which the information bearing surface of original is optically scanned relatively and the color informations on the surface are discriminated for reading.

2. Description of the Prior Art

In the art there are known various types of readers which are adoptable in an image forming apparatus such as copying machine, facsimile etc. and which are used to read, for example, informations on an original document. One such readers is of the type in which an original table on which the information bearing surface is placed or movable elements constituting a reading optical system is reciprocated for reading the necessary information when it is wished to make two or more copies from an original.

In this type of known reader, reading is carried out only during the time of the movable member being moved forward and no reading is performed during the backward movement thereof. Therefore, the time required to read the original surface one time is essentially equal to the time required to complete one reciprocating motion of the movable member. It is obvious that this means a time consuming operation. To eliminate this disadvantage and to improve the reading efficiency, it has been proposed to increase up the speed of the backward movement as much as possible.

However, this known solution involves some problems. The mechanism for driving the movable member becomes very complicated. In addition, since the movable member is moved backward at a higher speed, means are required for absorbing the large shock generated when the moving member is stopped. This requirement also makes the stopping mechanism complicated.

As an important solution to the above problems, in the art, for example, in the art of electrophotography, there has been proposed so-called reciprocation reading process according to which the original surface is scanned not only during the forward movement of the movable member but also during the time of its backward movement. This is realized by interposing a Dach-prism (roof prism) or a Dach-mirror in the optical path for projecting the light image of original onto a photo-reception surface.

This known solution also involves some disadvantages. In the former case, one or two Dachprisms are required. The use of Dachprism brings forth the disadvantage of large loss of light. In addition, a particular mechanism is required to move the prism(s). Further, the positional relation thereof has to be changed for the forward movement and for the backward movement which also requires an additional change-over mechanism. After all, the driving part of the apparatus is very much complicated. This is the same in the latter case wherein Dach-mirror is used.

At present, there is an increasing tendency toward miniaturization of apparatus. Many efforts made in the art for this purpose have shown the need of reducing the optical path length itself. The above mentioned solution needs one or two Dachprisms or Dach-mirrors disposed in the optical path. Obviously, this is against the purpose of miniaturization and therefore not preferable.

As another development of a recording system there is known such type of novel image forming apparatus in which informations on an original are read in terms of bit units by self-scanning type photoreceptor elements or the like to transform the informations into electrical signals and recording is carried out digitally relying upon the electrical signals. One example of these novel recording systems an ink jet recording system.

If multicolor recording is wished with the ink jet recording system, two or more recording heads must be used. This is because with one and single recording head, the desired multicolor recording is hardly attainable in view of difficulty involved in ink supply. Generally, it is required to provide a plural number of heads equal to the number of colors to be used at that time for recording. For example, when recording is to be performed in two colors, red an black, two recording heads are usually required one for red and the other for black. In this connection, it should be noted that these two sets of heads are not allowed to be close to each other in arrangement. Some space must be provided between them for maintenance and also because of volume of head itself. Such space is necessary also for preventing the mixture of colors which may be caused by blotting of red and black inks on a recording paper at the time of printing. Furthermore, the time required to dry one of the color inks necessitates a certain interhead distance corresponding to the time.

Since the recording heads are disposed spaced from each other for the reasons mentioned above, reading of information must be made at two different points on the original simultaneously. The distance between the two points on the original corresponds to that between the two recording heads. Thus, when recording is carried out while driving both of the red and black recording heads simultaneously, reading and recording have to be carried out regarding information not at the same position on an original but at two different positions. The reading signals obtained at the two different points must be transmitted to the recording heads to effect multi-color recording.

To read a color original in terms of bit units and discriminate the color thereof between red and black, various known discriminating methods may be employed. According to one typical method, there is used a color separation system such as a beam splitter. A point on an original is divided into particular spectral wavelength regions by a beam splitter and then intensity of the spectral wavelength is detected by photoreceptor elements for every divided spectral wavelength region to discriminate one color from another.

Employing the prior art techniques relating to the ink jet head and color separation system described above, dichromatic recording can be realized by using two color separation systems for reading two points (two lines) on an original spaced from each other with a distance corresponding to the distance between two recording heads. However, this method requires four photoreceptor elements (2×2). Therefore, a larger space is required to receive the photoreceptor elements and also a complicated circuit is required to drive the elements. These are important disadvantages of the chromatic recording method.

SUMMARY OF THE INVENTION

Accordingly, it is a general object of the invention to eliminate the disadvantages of the prior art mentioned above.

More particularly, it is an object of the invention to provide an improved reader of the type which reads color informations by optically and relatively scanning a surface bearing the informations and discriminating said informations using photoreceptor elements.

It is another object of the invention to provided such a reader which is simple in structure and which can read informations at a higher speed in a manner of reciprocal reading without any need of providing a complicated optical system in the optical path for relative reciprocal optical scanning of the information bearing surface and reading of the informations.

To attain the above objects according to the invention there is provided an information reader which comprises means for irradiating the color information bearing surface by light; optical separation means for separating the light coming from said surface into a light component of long wavelength side and a light component of short wavelength side; and reading means having three photoreceptor elements of which the first and third elements are disposed to receive the light component of long wavelength side and the second one to receive that of short wavelength side. One of the color informations is discriminated from the other by the first photoreceptor element and the other color information is discriminated by the second and third elements. Said reading means produces electric output signals corresponding to the respective color informations.

According to another aspect of the invention there is provided a reader apparatus comprising an original table on which an original bearing informations to be read is placed; means for irradiating the information bearing surface of the original laid on the original table by light; an optical system for relatively and optically scanning the information bearing surface; optical separation means disposed behind said optical system for separating the beam of light transmitted through said optical system into a first beam of light mainly composed of light component of long wavelength side relative to a reference wavelength and a second beam of light mainly composed of light component of short wavelength side relative to the reference wavelength; and reading means including three photoreceptor elements of which the first and third elements are disposed to receive said first beam of light and the second one is disposed to receive said second beam of light and so arranged as to discriminate one of the color informations from the other by means of said first photoreceptor element and discriminate the other color information by means of said second and third elements thereby producing electric output signals corresponding to the color informations.

Other and further objects, features and advantages of the invention will appear more fully from the following description taken in connection with the accompanying drawings.

DESCRIPTION OF PREFERRED EMBODIMENTS

Figure 1:
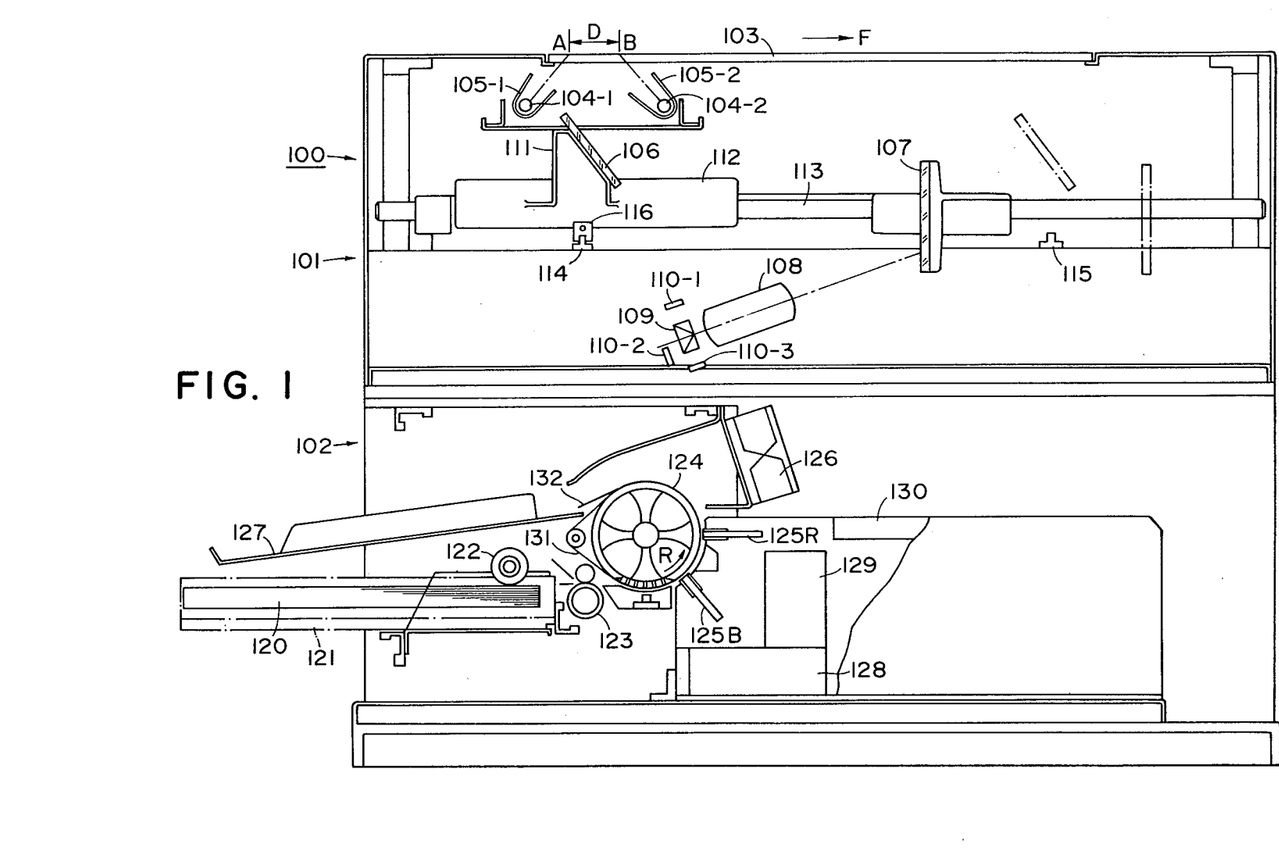
FIG. 1 schematically shows an image forming apparatus in which the present invention is embodied.

Referring first to FIG. 1 showing a preferred embodiment of the invention, the image forming apparatus designated generally by 100 is composed of two parts, that is, a reading part 101 for reading informations on an original surface and a writing part 102 for writing the read informations on a recording medium such as paper.

The reading part 101 has an original table 103 formed at the top of the part. The original table is made of, for example, a glass plate in a manner as shown in FIG. 1. An original bearing color informations to be read and recorded is laid on the table 103. Arranged under the original table 103 are means for irradiating the original by light, namely rod-shaped light source 104-1, 104-2 which may be a pair of fluorescent lamps with reflectors 105-1, 105-2, first and second plane mirrors 106 and 107 for scanning the original (secondary scan), an optical lens system 108 for focusing a light image of the original, a beam splitter for color separation 109 and photoreceptor elements 110-1, 110-2 and 110-3. Each photoreceptor element is a self-scanning type photoreceptor element formed by arranging a number of small elements in row.

Light sources 104-1, 104-2, reflectors 105-1, 105-2 and the first plane mirror 106 are fixedly mounted on a support member 111 which is in turn fixed to a base member 112. The base member 112 is moved forward (arrow F) and backward along a guide rail 113. Therefore, as the base member 112 moves along the guide rail 113, the above-mentioned light sources, reflectors and the first mirror also move all together in the same direction.

The second plane mirror 107 is mounted movably on the guide rail 113. The running direction of the second mirror 107 is the same as that of the first one and the running speed of the second mirror is a half (½) of the running speed of the first one. Thus, for forward scanning, the plane mirrors 106 and 107 are moved up to the positions indicated by the chain-dotted lines respectively so that the optical path length extending from the original table to the lens system 108 through the mirrors 106 and 107 is kept constant.

The primary scanning directions of photoreceptor elements 110-1, 110-2 and 110-3 are all normal to the plane of the drawing. If signals from a number of small photo elements constituting the photoreceptor elements 110-1, 110-2 and 110-3 can be read out sequentially during the movement of mirrors 106 and 107, then there will be obtained from the photoreceptor elements such sequential signals which have a time series sequence as will be obtained when the original surface is raster scanned.

At the home position and return position of the scanning mirror in the reading part 101 there are provided detectors 114 and 115 to detect the home position and the return position respectively. The light incident upon the detectors is switched On and Off by light screen means 116 provided on the base 112 carrying the first mirror 106. As the detectors 114 and 115 there may be, for example, photo switches.

Arrangement of the three photoreceptor elements in the reading part 101 is determined depending upon the positional relation between the writing heads in the writing part 102 used to effect printing in different colors, for example, in red and black. In the shown embodiment, two of the three photoreceptor elements are disposed on the same side relative to the extension of the optical axis of the lens system 108. The remaining one is disposed on the opposite side. Behind the lens system 108 in the optical path of light to the photoreceptor element group 110 there is provided a beam splitter 109 by which the light transmitted through the lens system 108 is focused on the respective light receiving surfaces of the photoreceptor elements 110 as information images of the original to be read.

The beam splitter 109 is composed of a dichroic mirror. When writing is made in red and black, the dichroic mirror transmits light of short wavelength (blue side) in the visible region and reflects light of long wavelength (red side). A particular arrangement of this dichroic mirror and three photoreceptor elements 110-1, 110-2, 110-3 as shown in FIG. 1 enables discrimination of the signal between a red signal and black signal. After discrimination the red signal is introduced into the driving circuit for a red color writing head 125R and the black signal into the driving circuit for a black color writing head 125B.

While the combination of red and black has been particularly shown and described in the above, the present invention is never limited to this combination of colors only. Any other combination of colors may be used in light of the teachings herein. It is a matter of course that the dichroic mirror for beam splitter 109 should be suitably selected in accordance with the color combination selected. To allow discrimination between the two colors selected, such dichroic mirror should be used which transmits only visible light in a particular range of wavelength and reflects light in other ranges.

The beam splitter 109 may be formed in other ways than the FIG. 1 embodiment using a dichroic mirror. For example, a half mirror may be used in place of the dichroic mirror. In this case, for every photoreceptor element 110 there is provided a predetermined color filter in the optical path between the half mirror and the light receiving surface of the photoreceptor element or on the light receiving surface or on the light exit side of the half mirror to enable discrimination between the selected two colors.

The writing part 102 of the image forming apparatus shown in FIG. 1 has the following various members:

Paper supply cassette 121 containing recording paper 120 serving as a recording medium; paper feed roller 122 and timing roller 123 for feeding the recording paper 120 from the cassette 121 in the direction to be conveyed; a rotary drum 124 rotatably mounted to convey the recording paper laid around the drum during the time of recording; two sets of ink jet heads 125B and 125R for printing in black (125B) and red (125R); a fan 126 for drying the ink on the recording paper; discharge paper tray 127; black ink tank 128 for supplying black ink to the ink jet head 125B and red ink tank 129 for ink jet head 125R; and driving part 130 containing therein circuits for driving the heads 125B and 125R.

On the surface of rotary drum 124 there are provided a large number of suction holes arranged at small intervals. The drum 124 is driven rotating at a constant speed in the direction indicated by arrow R by a driving source not shown and the air within the drum is evacuated by suction means not shown to discharge the air from the drum.

The recording paper is guided onto the rotary drum 124 by the paper feed roller 122 and timing roller 123 and then the paper is wound around the drum by suction through the suction holes. The recording paper rotates, therefore, together with the drum 124 and writing is carried out on the recording paper by the heads 125B and 125R in response to reading signals coming from the reading part 101. The recording paper on which writing has been completed is moved to the top portion of the drum where the paper is separated from the drum surface by means of separation belt 131 and stripping pawl 132 and then it is received by the tray 127.

The fan 126 is brought into operation when necessary. The fan serves to dry the ink printed on the recording paper when it reaches the top area of the drum and also to aid the paper in moving toward the discharge tray 127.

Each ink jet head 125B, 125R may be formed, for example, as a full line multi-orifice head having a number or orifices arranged in a row or in a zigzag line with a density equal to the degree of resolution desired. The length of a row in which the orifices are arranged is essentially equal to the width of the recording paper. Therefore, the primary scanning direction of the self-scanning type photoreceptor elements 110 is coincident with the direction of row of orifices in the full line multi-orifice ink jet head. The secondary scanning direction F is coincident with the rotational direction R of the recording paper. With this arrangement, recording can be performed by writing the image information of original on a recording paper laid on the rotary drum 124 while scanning the original surface bearing the information.

The two ink jet heads 125B and 125R are arranged around the drum circumference with a distance D between the two heads, measured in respect to the ink droplet impact point on the recording paper. Accordingly, on the original surface laid on the original table 103, two points of information A and B spaced from each other by the same distance of D have to be read at the same time. The reading part 101 of the invention is so formed as to be able to carry out this reading. The manner of operation of the reading part 101 will be described in detail hereinafter with reference to FIG. 2.

Figure 2:
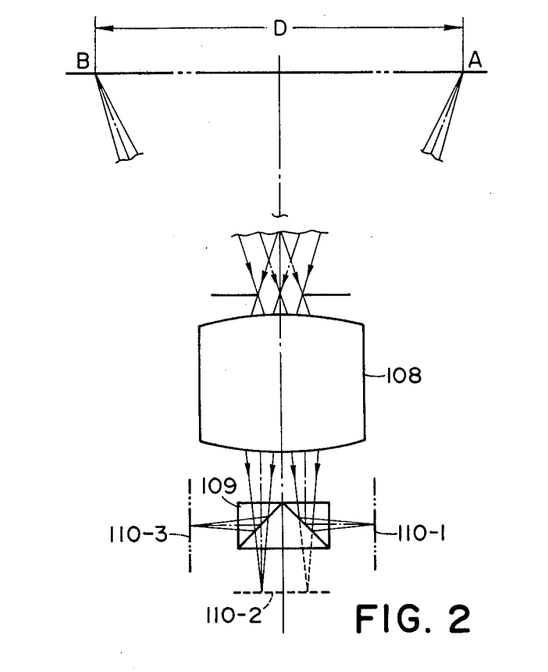
FIG. 2 illustrates the manner of reading of the reader used in the apparatus shown in FIG. 1.

In FIG. 2, the plane mirrors 106 and 107 are omitted for the purpose of simplification. The two points A and B in FIG. 2 correspond to the two points A and B on the original table 103 shown in FIG. 1. The lens system 108, beam splitter 109 and photoreceptor elements 110-1, 110-2 and 110-3 are all the same as those in FIG. 1. However, in FIG. 2, the photoreceptor elements 110 are suggested by chain-dotted lines to indicate their light receiving surfaces only.

The beam splitter 109 in the optical system shown in FIG. 2 is composed of a dichroic mirror which transmits short wavelengths of light (blue side) of visible region and reflects long wavelengths of light (red side).

To form the photoreceptor element 110 there may be used, for example, the following image sensors:

Self-scanning type unidimensional CCD (Charge Coupled Device) image sensor, CTD (Charge Transfer Device) image sensor such as unidimensional BBD (Bucket Brigade Device) image sensor, thin film unidimensional image sensor having a light receiving part formed using amorphous silicon, chalcogen system unidimensional image sensor having a light receiving part formed using Se-Te etc.

The photoreceptor element 110-1 is disposed to read the information at point B on the original table and 110-2 and 110-3 are disposed to read the information at A. The beam splitter 109 selects wavelength of light in such manner that a beam of light mainly composed of the long wavelength region of light component can enter the elements 110-1 and 110-3 and a beam of light mainly composed of the short wavelength region of light component can enter the element 110-2.

The thing necessary to detect black information and red information with these three photoreceptor elements 110-1, 110-2 and 110-3 is to detect black by 110-1 and red by 110-2 and 110-3. Since the light incident upon the photoreceptor element 110-1 is only that of long wavelength region, it is sensitive to red information on the original and to white background (area where no image information is present) information. It is insensitive to black information. Therefore, in a manner as later described, discrimination of black information is possible with this element. The sensitivity of 110-3 to color is the same as 110-1. But, the remaining element 110-2 which receives only the light of short wavelength region is sensitive to white background information and insensitive to both of red and black informations. The color information to which 110-3 is sensitive and 110-2 is insensitive is therefore red. Accordingly, detection of red is possible.

The discrimination of black information by only one photoreceptor element 110-1 is attainable in the following manner:

Since, as noted above, the photoreceptor element 110-1 has sensibility to red information and white information but not to black information, discrimination of black information can be made by designing the electric circuit after-connected to 110-1 in such manner that it puts out no writing signal when the photoreceptor element 110-1 sensed the incident light reflected from the optically scanned original surface and puts out a writing signal only when the photoreceptor element 110-1 did not sense the light.

Discrimination of red information by photoreceptor elements 110-2 and 110-3 can be made in a manner similar to the above. In this case, the electric circuit is so designed as to put out a writing signal only when 110-2 did not sense the incident light and 110-3 sensed it.

Figure 3:
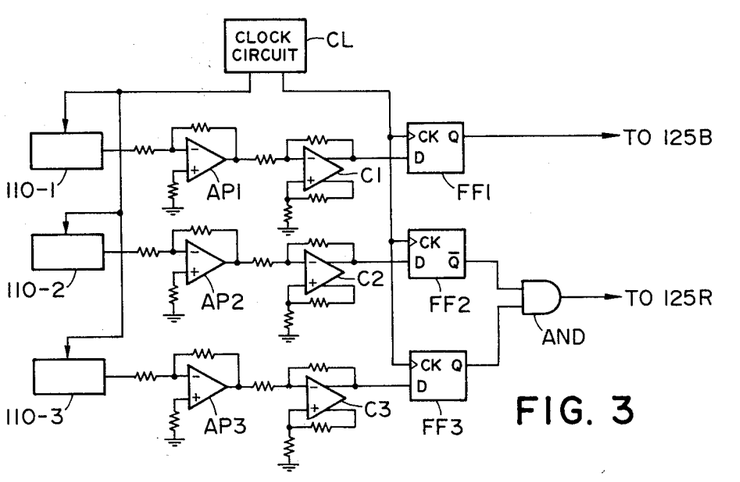
FIG. 3 is a circuit diagram showing a form of electric circuit used in the invention.

FIG. 3 shows a form of electric circuit used in the reading part shown in FIG. 1.

Outputs from the three photoreceptor elements 110-1, 110-2, 110-3 are amplified by amplifiers AP1, AP2 and AP3 respectively. Thereafter, the outputs are checked by comparators C1, C2 and C3 as to whether the respective photoreceptor elements sensed the incident light or not. Namely, the color information is binary converted. The binary converted data is applied to D input terminals of D type flip-flops FF1, FF2 and FF3 respectively and then held therein according to the timing signal issued from a clock circuit CL. Output Q of the flip-flop FF1 is delivered directly to the black color writing head 125B. Output $\overline{Q}$ of FF2 and output Q of FF3 are introduced into an AND circuit AND which detects red whose output is then delivered to the red color writing head 125R.

Figure 4:
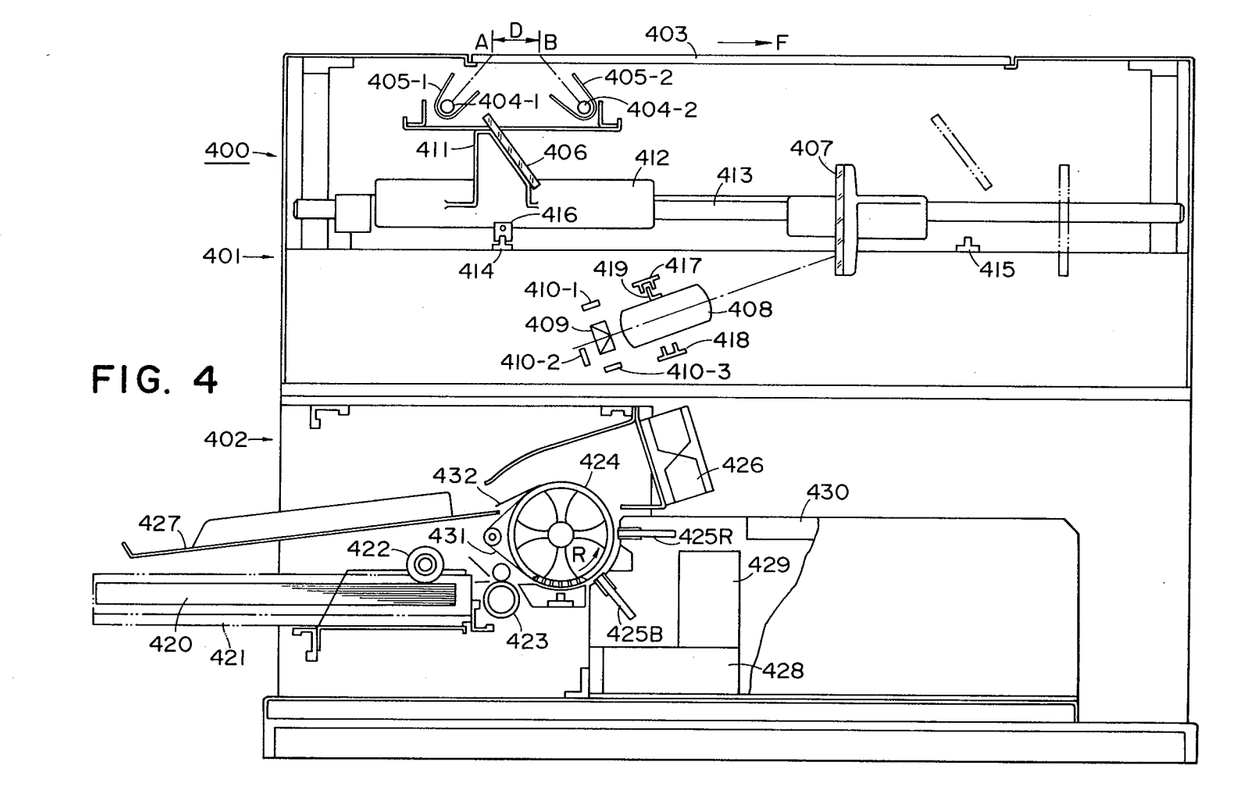
FIG. 4 is a schematic view similar to FIG. 1 showing another embodiment of image forming apparatus provided with a reader according to the invention.

FIG. 4 shows another embodiment of the invention.

The image forming apparatus 400 shown in FIG. 4 includes, like the apparatus 100 in FIG. 1, a reading part 401 and a writing part 402. The FIG. 4 embodiment is different from the FIG. 1 embodiment in the arrangement of a portion essential for the reading part to discriminate between color informations. The difference will appear fully from the following description of the FIG. 4 embodiment.

At the top of the reading part 401 there is formed an original table 403 which is made of, for example, glass. An original bearing color informations to be recorded is laid on the table 403. Arranged under the table 403 are rod-shaped light sources 404-1, 404-2 which may be a pair of fluorescent lamps with reflectors 405-1, 405-2, first and second plane mirrors 406 and 407 for scanning the original (secondary scan), an optical lens system 408 for focusing a light image of the original, a beam splitter for color separation 409 and photoreceptor elements 410-1, 410-2 and 410-3. Each photoreceptor element is a self-scanning type photoreceptor element formed by arranging a number of small elements in row.

Light sources 404-1, 404-2, reflectors 405-1, 405-2 and the first plane mirror 406 are fixedly mounted on a support member 411 which is in turn fixed to a base member 412. The base member 412 is moved forward (arrow F) and backward along a guide rail 413. Therefore, as the base member 412 moves along the guide rail 413, the above-mentioned light sources, reflectors and the first mirror also move all together in the same direction.

The second plane mirror 407 is mounted movably on the guide rail 413. The running direction of the second mirror 407 is the same as that of the first one and the running speed of the second mirror is a half ($\frac{1}{2}$) of the running speed of the first one. Thus, for forward scanning, the plane mirrors 406 and 407 are moved up to the positions indicated by chain-dotted lines respectively so that the optical path length extending from the original table to the lens system 408 through the mirrors 406 and 407 can be kept constant.

The primary scanning directions of photoreceptor elements 410-1, 410-2 and 410-3 are all normal to the plane of the drawing. If signals from a number of small photo-receiving elements constituting the photoreceptor elements 410-1, 410-2 and 410-3 can be read out sequentially during the movement of mirrors 406 and 407, then there will be obtained from the photoreceptor elements such sequential signals which have a time series sequence as will be obtained when the original surface is raster scanned.

At the home position and return position of the scanning mirror in the reading part 401 there are provided detectors 414 and 415 to detect the home position and the return position respectively. The light incident upon the detectors is switched On and Off by light screen means 416 provided on the base 412 carrying the first mirror 406. As the detectors 414 and 415 there may be, for example, photo switches. On the other hand, around the lens system 408 there are also provided two detectors 417 and 418 which may be of the same type as that of the above detectors 414 and 415. The two detectors 417 and 418 are disposed spaced from each other 180° relative to the optical axis of lens system 408. On-Off of the detectors is effected by screen means mounted on the lens tube of lens system 408.

Arrangement of the three photoreceptor elements in the reading part 401 is determined depending upon the positional relation between the writing heads in the writing part 402 used to effect printing in different colors, for example, in red and black. In the shown embodiment, two of the three photoreceptor elements are disposed on the same side relative to the extension of optical axis of the lens system 408. The remaining one is disposed on the opposite side. Behind the lens system 408 in the optical path of light toward the photoreceptor element group 410 there is provided a beam splitter 409 by which the light transmitted through the lens system 408 is focused on the respective light receiving surfaces of the photoreceptor elements 410 as information images of the original to be read.

The beam splitter 409 is composed of a dichroic mirror. When writing is made in red and black, the dichroic mirror transmits light of short wavelength (blue side) in visible region and reflects light of long wavelength (red side). A particular arrangement of this dichroic mirror and three photoreceptor elements 410-1, 410-2, 410-3 as shown in FIG. 4 enables discrimination of the information between red and black. After being discriminated, the red signal is introduced into the driving circuit for a red color writing head 425R and the black signal into the driving circuit for a black color writing head 425B.

To make the photoreceptor elements 410-1, 410-2, 410-3 have the same positional relation relative to the scanning direction (secondary scanning direction) of the optical system for both forward and backward movements, the disposition of the photoreceptor elements is changed over between the position for forward movement and that for backward movement. More particularly, the three photoreceptor elements 410-1, 410-2, 410-3, beam splitter 409 and lens 408 constitute together a rotary unit and the movement of the first mirror 406 causes the detector 414 or 415 to issue an output. The rotary unit is rotated an angular distance of $\pi$ about the optical axis of the lens system 408 as an axis of symmetry of rotation every time the output signal is issued.

In this manner, the rotary unit is rotated intermittently by $\pi$ every time in synchronism with the movement of the moving mirrors 406 and 407. In the embodiment shown in FIG. 4, as mentioned above, the rotary unit is constituted of a lens system 408, beam splitter 409 and photoreceptor elements 410 so as to prevent any displacement of the optical axis. However, although this is a preferred embodiment, it is not always necessary to rotate the lens system 408. The thing essential is to rotate the light receiving surfaces of the photoreceptor elements 410 about the optical axis of the lens system 408 by $\pi$ according to the above mentioned signal. Therefore, if there is no need for worrying about displacement of the optical axis, then the photoreceptor elements 410 and beam splitter 409 may be assembled to form the rotary unit while the lens system is fixedly mounted. Further, it is also possible to form the rotary unit only of the photoreceptor elements 410 while the lens system 408 and beam splitter 409 remain fixed.

Also, it is not always necessary to provide the detectors 417 and 418 around the lens tube of the lens system 408. In the FIG. 4 embodiment, the detectors 417 and 418 have been provided to assure that the lens system 408 is in its stop position correctly after the rotation caused by the output signal from the detector 414 or 415.

While the reading part 401 in FIG. 4 has been shown and described to include three photoreceptor elements 410 to effect dichromatic printing at the writing part 402, the number of photoreceptor elements to be provided is never limited to three. For monochromatic printing there may be provided only one photoreceptor element 410.

The writing part 402 of image forming apparatus shown in FIG. 4 has the following various members:

Paper supply cassette 421 containing recording paper 420 serving as a recording medium; paper feed roller 422 and timing roller 423 for feeding the recording paper 420 from the cassette 421 in the direction to be conveyed; a rotary drum 424 rotatably mounted to convey the recording paper laid around the drum during the time of recording; two sets of ink jet heads 425B and 425R for printing in black (425B) and red (425R); a fan 426 for drying the ink on the recording paper; discharge paper tray 427; black ink tank 428 for supplying black ink to the ink jet head 425B and red ink tank 429 for ink jet head 425R; and driving part 430 containing therein circuits for driving the heads 425B and 425R.

The writing part 402 of the image forming apparatus shown in FIG. 4 is essentially the same as the writing part 102 of the image forming apparatus 100 shown in FIG. 1. Therefore, the writing part 402 and its operation need not be further described.

Figure 5A:
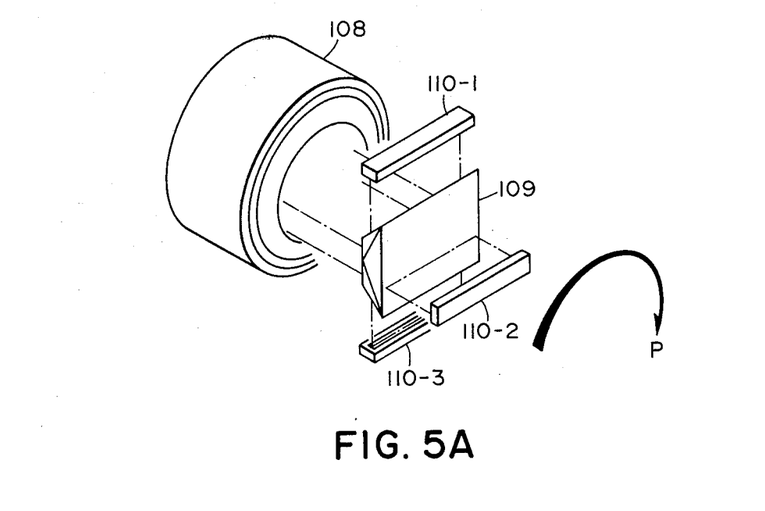
FIGS. 5A and 5B illustrate the manner of operation of the reader in the FIG. 4 embodiment.
Figure 5B:
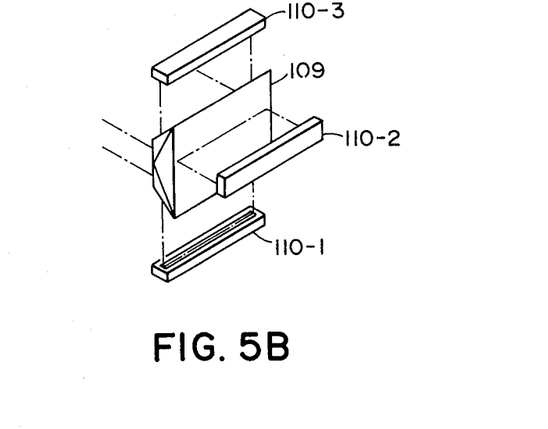

The operational relation between the reading and writing parts 401 and 402 to effect writing with ink jet heads 425B and 425R is similar to that in the above embodiment. The principle of reading operation of the reading part 401 will be understood readily from the description previously made with reference to FIG. 2. The difference between the two embodiments is found only in that the lens system 408, beam splitter 409 and three photoreceptor elements 410-1, 410-2, 410-3 in the FIG. 4 embodiment are assembled together to form a unitary rotary unit which is rotated in the direction of arrow P in FIG. 5A about the optical axis of the lens system 408. As described above, the unit is rotated by $\pi$ every time. FIG. 5A shows one of the two different positions which the rotary unit takes, and FIG. 5B shows the other position. Assuming that the position of the rotary unit shown in FIG. 5A is the position which the unit takes for forward movement of optical scan, the unit is rotated by $\pi$ after one forward optical scan so that it is brought into the other position shown in FIG. 5B which is, in this case, the position of the rotary unit for backward movement of optical scan.

Figure 6:
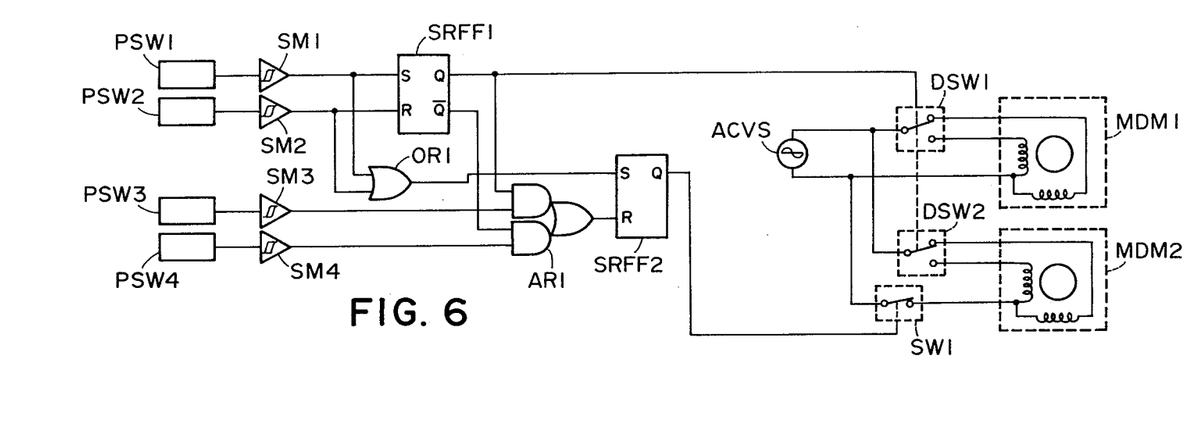
FIG. 6 is a circuit diagram showing the electric circuit of the reading part in the FIG. 4 embodiment.

FIG. 6 shows a form of electric circuit used in the apparatus 400 to control the operation of the reading part 401.

In FIG. 6 PSW1 and PSW2 are photo switches which constitute the detectors 414 and 415 for detecting the positions of moving mirror shown in FIG. 4. PSW3 and PSW2 are photo switches which constitute the detectors 417 and 418 for detecting the positions of the photoreceptor elements 410 respectively. PSW1, PSW2, PSW3 and PSW4 are switches the output signals of which are wave shaped by Schmidt circuits SM1, SM2, and SM3. Output of PSW1 is applied to the set terminal S of set-reset flip-flop SRFF1 through SM1 and output of PSW2 is applied to the reset terminal of the same flip-flop SRFF1 through SM2. The Q output of the SRFF1 controls the opening and closing of a double throw switch DSW1 which may be, for example, a solid state relay connected to an AC voltage source ACVS. The double throw switch DSW1 controls the forward and backward rotations of a mirror driving motor MDM1 which may be a reversible motor or the like.

Outputs of the switches PSW1 and PSW2 are also introduced into an OR circuit OR1 to make up a logical sum thereof which is applied to the set terminal S of set-reset flip-flop SRFF2.

On the other hand, outputs of PSW3 and PSW4 are applied to the reset terminal R of flip-flop SRFF2 through an AND-OR circuit AR1. Output Q of SRFF2 controls the On-Off of a power source for motor MDM2 which drives the lens system 408 and photoreceptor elements 410 in rotation. Like MDM1, the driving motor MDM2 is controlled by a double throw switch DSW2 which is also controlled by the output of flip-flop SRFF1.

Figure 7:
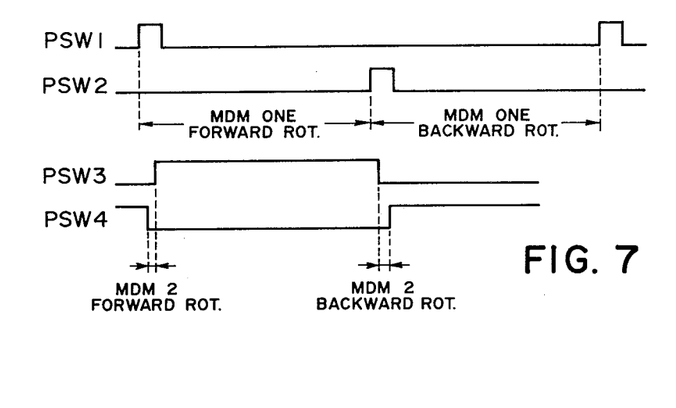
FIG. 7 is a timing chart of the circuit shown in FIG. 6.

Operation of the circuit shown in FIG. 6 will be described hereinunder with reference to the timing chart shown in FIG. 7.

For the sake of description, it is assumed that the outputs of switches PSW1, PSW2, PSW3 and PSW4 are turned to high level when light is cut off by screen 416, 419.

At first, when the mirrors 406 and 407 are in the position indicated by the solid line in FIG. 4, switch PSW1 has a high level output to set the output of flip-flop SRFF1 and to make the motor MDM1 rotate forward. At the same time, the second flip-flop SRFF2 is also set and the motor MDM2 for rotating the lens system 408 and photoreceptor elements 410 rotates forward. The forward motion continues until the lens system reaches the determined position. In this position, the output of PSW3 becomes high level and therefore the flip-flop SRFF1 is reset. SW1 is turned off and motor MDM2 is stopped.

When the first mirror 409 driven moving forward by the forward rotation of motor MDM1 reaches the position of switch PSW2 (detector 415), it issues a high level output to reset SRFF1. Thus, the rotational motion of motor MDM1 is reversed and the mirror 406 now moves backward. At the same time, the flip-flop SRFF2 is also set again to reverse the motion of motor MDM2. Thus, the lens system 408 and three photoreceptor elements 410 are rotated 180°. When the output of PSW4 is turned to high level, the flip-flop SRFF2 is again reset and therefore the rotation is stopped. This operation is repeated until reciprocal reading is completed.

While, in the above embodiments, an ink jet head has been particularly shown and described as a preferred writing head, the invention is never limited to the use of ink jet head only. The reading part of the invention may be used in combination with a writing part employing another type of writing head such as thermal head, magnetic recording head or electrostatic recording head. However, if printing is desired in two or more colors, then ink jet heads or thermal heads are preferably used.

Obviously many other modifications and variations of the present invention are possible in the light of the above teachings. The scope of the invention, therefore, is to be determined solely by the following claims.

What is claimed is:

1. A reader of the type in which an information bearing surface is optically scanned relatively in reciprocating motion to read the color informations on said surface, said reader comprising:

means for irradiating said information bearing surface by light;

optical separation means for separating the light coming from said information bearing surface into light of a long wavelength side and light of a short wavelength side; and reading means having three photoreceptor elements of which the first and third elements are disposed to receive said light of long wavelength side and the second one is disposed to receive said light of short wavelength side and arranged for discriminating one of said color informations by said first photoreceptor element and the other color information by said second and third photoreceptor elements thereby producing electric output signals corresponding to the respective color informations.

2. A reader according to claim 1, wherein said optical separation means is a dichroic mirror.

3. A reader according to claim 1, wherein said three photoreceptor elements are arranged in the optical path in such manner that the optical scan at said first photoreceptor element can be carried out at a determined distance from the optical scan at said second and third photoreceptor elements on said information bearing surface.

4. A reader according to claim 1, wherein said reader further comprises rotational driving means for symmetrically rotating said three photoreceptor elements to change the disposition thereof in response to a signal which is issued by detecting a change-over of the optical scan between forward scanning motion and backward scanning motion.

5. A reader according to claim 1, wherein said reader further comprises two sets of recording heads for recording said read informations in different colors on a recording medium in response to electric output signals from said reading means.

6. A reader according to claim 5, wherein said recording heads are ink jet recording heads.

7. A reader comprising:

an original table on which an original bearing color informations to be read is placed;

means for irradiating the information bearing surface of said original on said table by light;

an optical system for optically and relatively scanning said information bearing surface;

optical separation means disposed behind said optical system for separating the beam of light transmitted through said optical system into a first beam of light mainly composed of light component lying at a long wavelength side relative to a reference wavelength and a second beam of light mainly composed of light component lying at a short wavelength side; and reading means having three photoreceptor elements of which the first and third elements are disposed to receive said first beam of light and the second element is disposed to receive said second beam of light and arranged for discriminating one of said color informations by said first photoreceptor element and the other color information by said second and third photoreceptor elements thereby producing electric output signals corresponding to the respective color informations.

* * * * *